United States Patent
Acharya et al.

(10) Patent No.: US 6,425,250 B1
(45) Date of Patent: Jul. 30, 2002

(54) SYSTEM FOR PROVIDING CRYOGENIC REFRIGERATION USING AN UPSTREAM PULSE TUBE REFRIGERATOR

(75) Inventors: Arun Acharya, East Amherst; John H. Royal, Grand Island; Dante P. Bonaquist; Bayram Arman, both of Grand Island; Christian F. Gottzmann, Clarence, all of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/778,830

(22) Filed: Feb. 8, 2001

(51) Int. Cl.⁷ .................................................. F25B 9/00
(52) U.S. Cl. .............................................. 62/6; 62/434
(58) Field of Search .......................................... 62/6, 434

(56) References Cited

U.S. PATENT DOCUMENTS

| | | |
|---|---|---|
| 4,291,547 A | 9/1981 | Leo ............................. 62/402 |
| 4,953,366 A | 9/1990 | Swift et al. .................... 62/467 |
| 5,156,003 A | 10/1992 | Yoshiro et al. ................ 62/3.1 |
| 5,295,355 A | 3/1994 | Zhou et al. ....................... 62/6 |
| 5,412,952 A | 5/1995 | Ohtani et al. ..................... 62/6 |
| 5,435,136 A | 7/1995 | Ishizaki et al. ................ 60/517 |
| 5,441,658 A | 8/1995 | Boyarsky et al. ............. 252/67 |
| 5,579,654 A | 12/1996 | Longsworth et al. ......... 62/511 |
| 5,711,156 A | 1/1998 | Matsui et al. ..................... 62/6 |
| 5,813,234 A | 9/1998 | Wighard .......................... 62/6 |
| 5,887,449 A | 3/1999 | Pecharsky et al. ............. 62/3.1 |
| 6,050,083 A | 4/2000 | Meckler .................... 60/39.182 |
| 6,065,305 A | 5/2000 | Arman et al. ................. 62/613 |

*Primary Examiner*—Ronald Capossela
(74) *Attorney, Agent, or Firm*—Stanley Ktorides

(57) ABSTRACT

A system for providing refrigeration to a heat load, especially over a larger temperature range and at a cryogenic temperature, wherein pulse tube refrigeration cools a heat transfer medium to provide higher level refrigeration to a refrigeration fluid, and lower level refrigeration is provided to the refrigeration fluid using a non-pulse tube system.

8 Claims, 3 Drawing Sheets

FIG. 2

SYSTEM FOR PROVIDING CRYOGENIC REFRIGERATION USING AN UPSTREAM PULSE TUBE REFRIGERATOR

TECHNICAL FIELD

This invention relates generally to low temperature or cryogenic refrigeration and, more particularly, to pulse tube refrigeration.

BACKGROUND ART

The cooling, liquefaction and/or subcooling or densification of certain gases such as neon, hydrogen or helium requires the generation of very low temperature refrigeration. For example, at atmospheric pressure neon liquefies at 27.1 K, hydrogen liquefies at 20.39 K, and helium liquefies at 4.21 K. The generation of such very low temperature refrigeration is very expensive. Inasmuch as the use of fluids such as neon, hydrogen and helium are becoming increasingly important in such fields as energy generation, energy transmission, and electronics, any improvement in systems for the liquefaction of such fluids would be very desirable.

A recent significant advancement in the field of generating low temperature refrigeration is the pulse tube system wherein pulse energy is converted to refrigeration using an oscillating gas. Such systems can generate refrigeration to very low levels sufficient, for example, to liquefy helium. However, such refrigeration generated by pulse tube systems is very costly if the starting point is a relatively high temperature such as ambient temperature.

Accordingly, it is an object of this invention to provide a system for providing cryogenic refrigeration using a pulse tube system which can more efficiently provide such refrigeration than can heretofore available systems using pulse tube technology.

SUMMARY OF THE INVENTION

The above and other objects, which will become apparent to those skilled in the art upon a reading of this disclosure, are attained by the present invention, one aspect of which is:

A method for providing refrigeration to a heat load comprising:

(A) compressing pulse tube gas to produce hot compressed pulse tube gas, cooling the compressed pulse tube gas, and expanding the cooled pulse tube gas to produce cold pulse tube gas;

(B) warming the cold pulse tube gas by indirect heat exchange with heat transfer medium to produce cooled heat transfer medium, and warming the cooled heat transfer medium by indirect heat exchange with refrigeration fluid to produce cooled refrigeration fluid at a first temperature within the range of from 10 to 280 K;

(C) providing refrigeration into the cooled refrigeration fluid to produce cold refrigeration fluid at a second temperature lower than said first temperature and within the range of from 3 to 150 K; and (D) warming the cold refrigeration fluid by passing refrigeration from the cold refrigeration fluid into a heat load.

Another aspect of the invention is:

Apparatus for providing refrigeration to a heat load comprising:

(A) a pulse tube refrigerator comprising a regenerator body, a pulse tube body having a pulse tube heat exchanger, means for generating pressurized gas for oscillating flow within the regenerator body, and means for expanding gas within the pulse tube body through the pulse tube heat exchanger;

(B) a forecooling circuit comprising a forecooling heat exchanger, means for passing heat transfer medium from the pulse tube heat exchanger to the forecooling heat exchanger, and means for passing heat transfer medium from the forecooling heat exchanger to the pulse tube heat exchanger;

(C) means for passing refrigeration fluid to the forecooling heat exchanger, and means for providing refrigeration into the refrigeration fluid downstream of the forecooling heat exchanger; and (D) a heat load and means for passing refrigeration from the refrigeration fluid into the heat load.

As used herein the term "indirect heat exchange" means the bringing of fluids into heat exchange relation without any physical contact or intermixing of the fluids with each other.

As used herein the term "direct heat exchange" means the transfer of refrigeration through contact of cooling and heating entities.

As used herein the term "magnetize" means to induce magnetic properties to a substance by use of an externally applied electrical field.

As used herein the term "heat load" means an entity at a higher temperature capable of receiving refrigeration and thus being cooled to a lower temperature.

BRIEF DESCRIPTION OF THE DRAWINGS

FIG. 2 is a schematic representation of another preferred embodiment of the invention wherein lower level refrigeration is provided to the cooled refrigeration fluid by operation of a Brayton refrigerator.

DETAILED DESCRIPTION

Figure 1:
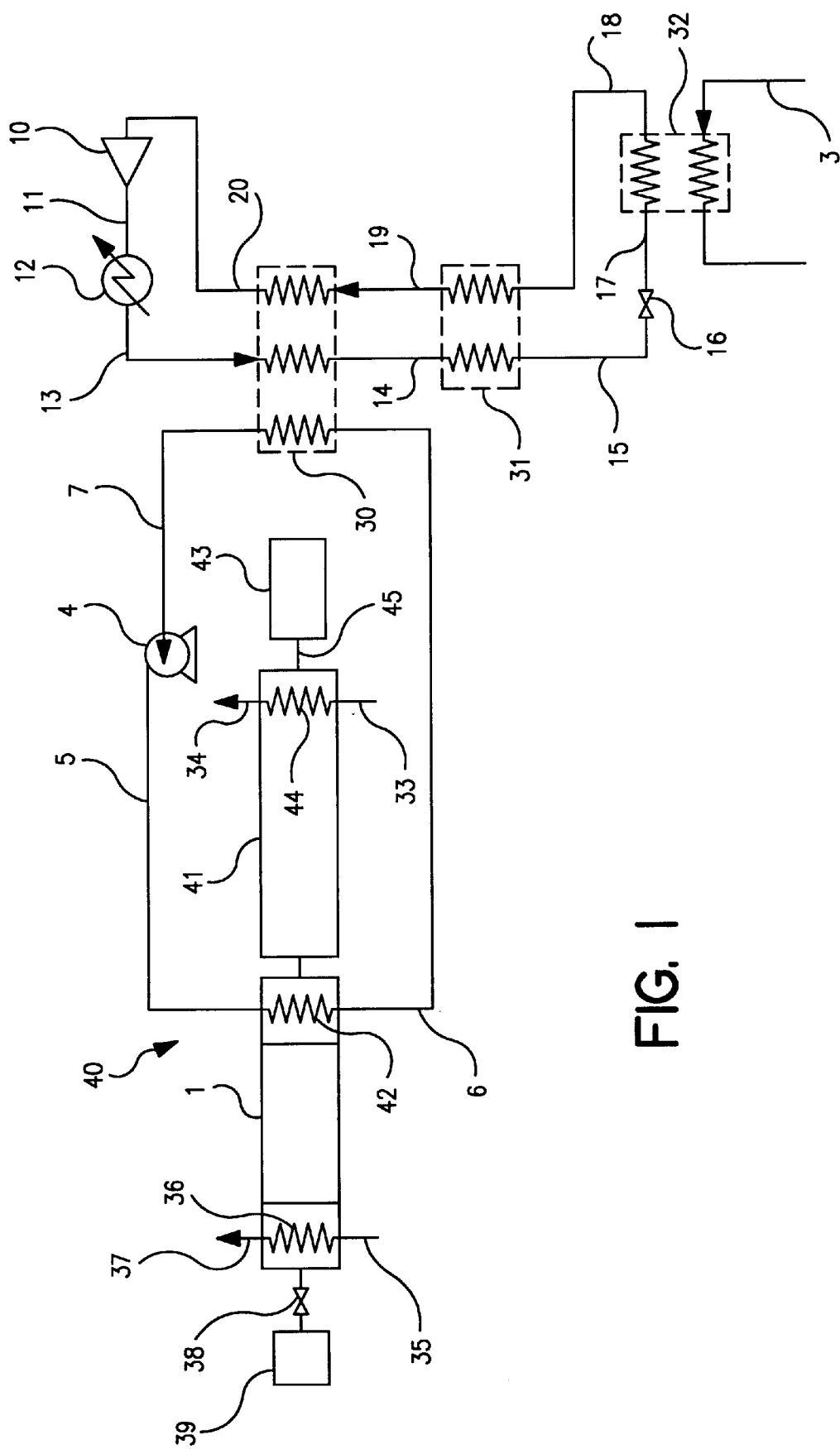
FIG. 1 is a schematic representation of one preferred embodiment of the invention wherein lower level refrigeration is provided to the cooled refrigeration fluid by operation of a multiple component refrigerant compression/expansion cycle.

The invention will be described in detail with reference to the Drawings. Referring now to FIG. 1, pulse tube refrigerator 40 comprises regenerator body 41 and pulse tube body 1 having pulse tube heat exchanger 42. Regenerator 41 contains pulse tube gas which may be hydrogen, neon, nitrogen, a mixture of helium and neon, a mixture of neon and nitrogen, or a mixture of helium and hydrogen. Mixtures of helium and hydrogen are preferred.

A pulse, i.e. a compressive force, is applied to the hot end of regenerator body 41 by means of pulse generator 43 thereby initiating the first part of the pulse tube sequence. Preferably the pulse is provided by a piston which compresses a reservoir of pulse tube gas in flow communication with regenerator body 41. Another preferred means of applying the pulse to the regenerator is by the use of a thermoacoustic driver which applies sound energy to the gas within the regenerator. Yet another way for applying the pulse is by means of a linear motor/compressor arrangement. Yet another means to apply pulse is by means of a loudspeaker. Another preferred means to apply pulse is by means of a travelling wave engine. The pulse serves to compress the pulse tube gas producing hot compressed pulse tube gas at the hot end of the regenerator body 41. The hot pulse tube gas is cooled by indirect heat exchange with heat transfer fluid 33 in heat exchanger 44 to produce warmed heat transfer fluid in stream 34 and to produce cooled compressed pulse tube gas for passage through the remainder of the regenerator body. Examples of fluids useful as the heat transfer fluid in the practice of this invention include water, air, ethylene glycol and the like.

The regenerator body contains heat transfer media. Examples of suitable heat transfer media in the practice of this invention include steel balls, wire mesh, high density honeycomb structures, expanded metals, lead balls, copper and its alloys, complexes of rare earth element(s) and transition metals.

The heat transfer media is at a cold temperature, generally within the range of from 10 to 280 K at the cold end to 200 to 310 K at the warm end, having been brought to this cold temperature in the second part of the pulse tube sequence which will be described more fully below. As the cooled compressed pulse tube gas passes through the regenerator body, it is further cooled by direct contact with the cold heat transfer media to produce warmed heat transfer media and further cooled pulse tube gas, generally at a temperature within the range of from 9 to 279K at the cold end to 199 to 309 at the warm end.

The further cooled pulse tube gas is passed from the regenerator body 41 to pulse tube body 1 at the cold end and is expanded through pulse tube heat exchanger 42. As the further cooled pulse tube gas passes into pulse tube body 1 at the cold end it generates a gas pressure wave which flows toward the warm end of pulse tube body 1 and compresses the gas within the pulse tube, termed the pulse tube working fluid, thereby heating the pulse tube working fluid.

Cooling fluid 35 is passed to heat exchanger 36 wherein it is warmed or vaporized by indirect heat exchange with the pulse tube working fluid, thus serving as a heat sink to cool the pulse tube working fluid. Resulting warmed or vaporized cooling fluid is withdrawn from heat exchanger 36 in stream 37. Preferably cooling fluid 35 is water, air, ethylene glycol or the like.

Attached to the warm end of pulse tube body 1 is a line having orifice 38 leading to reservoir 39. The compression wave of the pulse tube working fluid contacts the warm end wall of the pulse tube body and proceeds back in the second part of the pulse tube sequence. Orifice 38 and reservoir 39 are employed to maintain the pressure and flow waves in phase so that the pulse tube generates net refrigeration during the expansion and the compression cycles in the cold end of pulse tube body 1. Other means for maintaining the pressure and flow waves in phase which may be used in the practice of this invention include inertance tube and orifice, expander, linear alternator, bellows arrangements, and a work recovery line with a mass flux suppressor. In the expansion sequence, the pulse tube gas expands through pulse tube heat exchanger 42 to produce cold pulse tube gas at the cold end of the pulse tube body 1. The expanded gas reverses its direction such that it flows from the pulse tube body toward regenerator body 42.

The pulse tube gas emerging from pulse tube heat exchanger 42 is passed to regenerator body 41 wherein it directly contacts the heat transfer media within the regenerator body to produce the aforesaid cold heat transfer media, thereby completing the second part of the pulse tube refrigerant sequence and putting the regenerator into condition for the first part of a subsequent pulse tube refrigeration sequence.

In the practice of this invention the pulse tube body contains only gas for the transfer of the pressure energy from the expanding pulse tube gas at the cold end for the heating of the pulse tube working fluid at the warm end of the pulse tube. That is, pulse tube refrigerator 40 contain no moving parts such as are used with a piston arrangement. The operation of the pulse tube without moving parts is a significant advantage of this invention. The pulse tube may have a taper to aid adjustment of the proper phase angle between the pressure and flow waves. In addition, the pulse tube may have a passive displacer to help in separating the ends of the pulse tube. Furthermore, the pulse tube will have a connecting line between the pulse tube warm end and pressure wave line 45, replacing the orifice and reservoir with a mass flux suppressor such as a bellows arrangement to recover lost work.

Heat transfer medium is passed in line 7 to pump 4 and from there is pumped through line 5 to pulse tube heat exchanger 42 wherein it is cooled by indirect heat exchange with the cold pulse tube gas which was expanded into pulse tube body 1 from regenerator body 41. Examples of heat transfer medium suitable for use in the practice of this invention include helium, neon, hydrogen, atmospheric gases such as nitrogen, argon and air, hydrocarbons such as methane, ethane, ethylene, liquefied natural gas and liquefied petroleum gas, fluorocarbons and hydrofluorocarbons such as carbon tetrafluoride and fluoroform, selected fluoroethers and hydrofluoroethers, and mixtures comprising one or more of the above.

Resulting cooled heat transfer medium is passed from pulse tube heat exchanger 42 in line 6 to forecooling heat exchanger 30 wherein it is warmed serving to cool by indirect heat exchange refrigeration fluid passed to heat exchanger 30 in line 13. The warmed heat transfer medium is withdrawn from forecooling heat exchanger 30 in line 7 and recirculated back to the pulse tube refrigerator as was previously described.

In the embodiment of the invention illustrated in FIG. 1 the system used to provide lower level refrigeration to the refrigeration fluid is a multiple component refrigeration system wherein a multiple component refrigeration fluid recirculating in a circuit undergoes compression and expansion steps and delivers refrigeration to a heat load. In this embodiment the multicomponent refrigeration fluid preferably comprises at least one atmospheric gas preferably nitrogen, argon and/or neon, and preferably at least one fluorine containing compound having up to six carbon atoms such as fluorocarbons, hydrofluorocarbons, hydrochlorofluorocarbons, fluoroethers and hydrofluoroethers, and/or at least one hydrocarbon having up to five carbon atoms.

Referring back now to FIG. 1, compressed refrigeration fluid 13, which in this embodiment is a multicomponent refrigeration fluid, is cooled to a first temperature within the range of from 10 to 280 K by passage through forecooling heat exchanger 30 by indirect heat exchange with the aforediscussed warming heat transfer medium. Resulting cooled refrigeration fluid 14 is further cooled by passage through heat exchanger 31 and resulting refrigeration fluid stream 15 undergoes expansion through an expansion device, such as Joule-Thomson valve 16, to generate refrigeration. The refrigeration provided to the refrigeration fluid by the expansion through valve 16 results in the establishment of cold refrigeration fluid 17 at a second temperature, which is lower than the first temperature, and is within the range of from 3 to 150 K. The cold refrigeration fluid 17 is passed to heat exchanger 32 wherein it is warmed thereby passing refrigeration from the cold refrigeration fluid to heat load 3. Examples of the uses of the refrigeration passed into heat lead 3 include superconducting cable cooling, industrial gas liquefaction, reliquefaction, propellant densification, air separation, and cryogenic gas separation.

The resulting warmed refrigeration fluid 18 is further warmed by passage through heat exchanger 31 and then resulting stream 19 is still further warmed by passage through forecooling heat exchanger 30 wherein it assists in the cooling of the refrigeration fluid down to the first temperature. Resulting refrigeration fluid 20 from heat exchanger 30 is compressed to a pressure generally within the range of from 50 to 2000 pounds per square inch absolute (psia) in compressor 10. Compressed refrigeration fluid 11 is cooled of the heat of compression by passage through cooler 12 and resulting compressed refrigeration fluid 13 is passed to forecooling heat exchanger 30 and the refrigeration cycle repeats.

Figure 2:
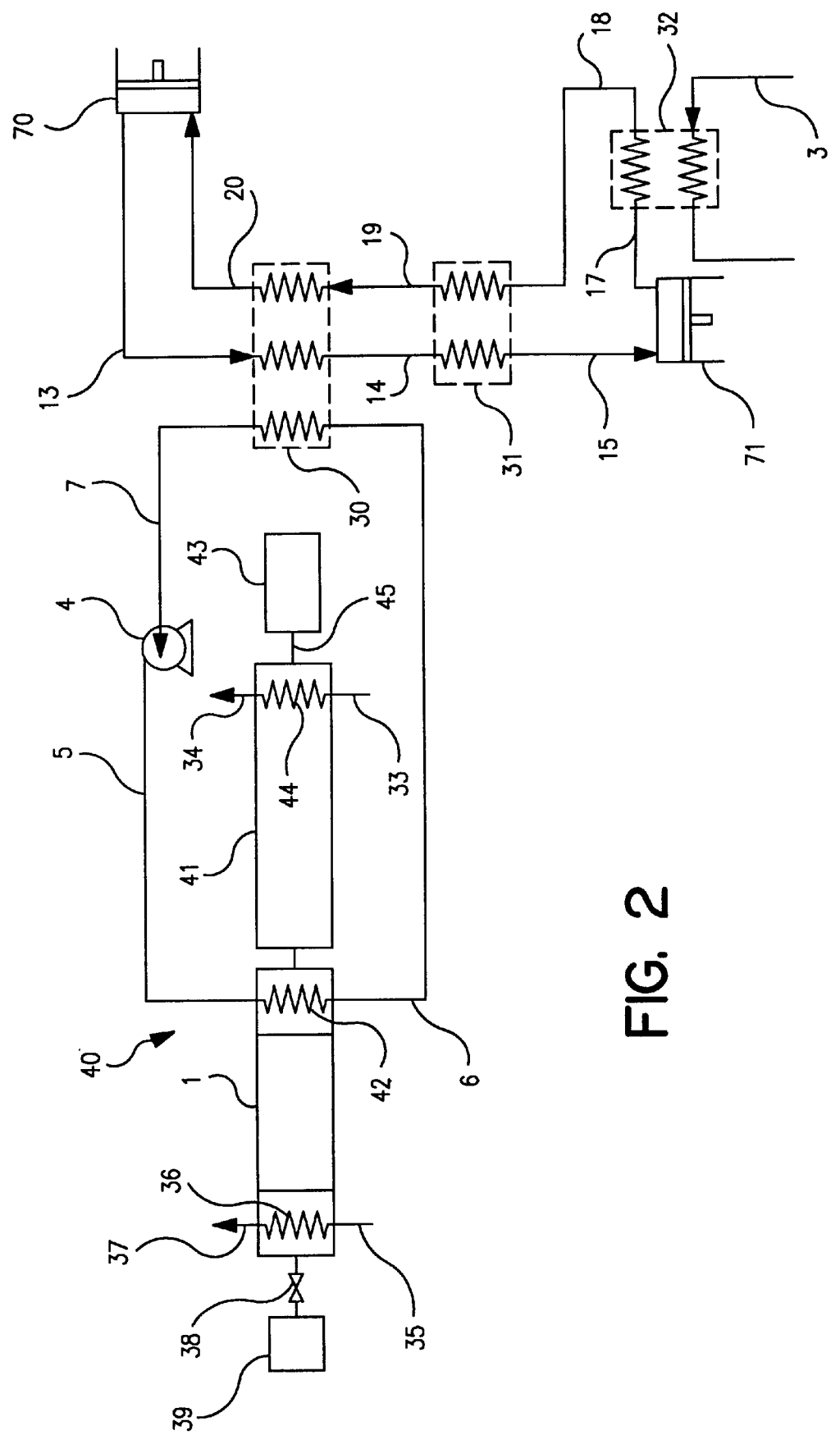
Figure 3:
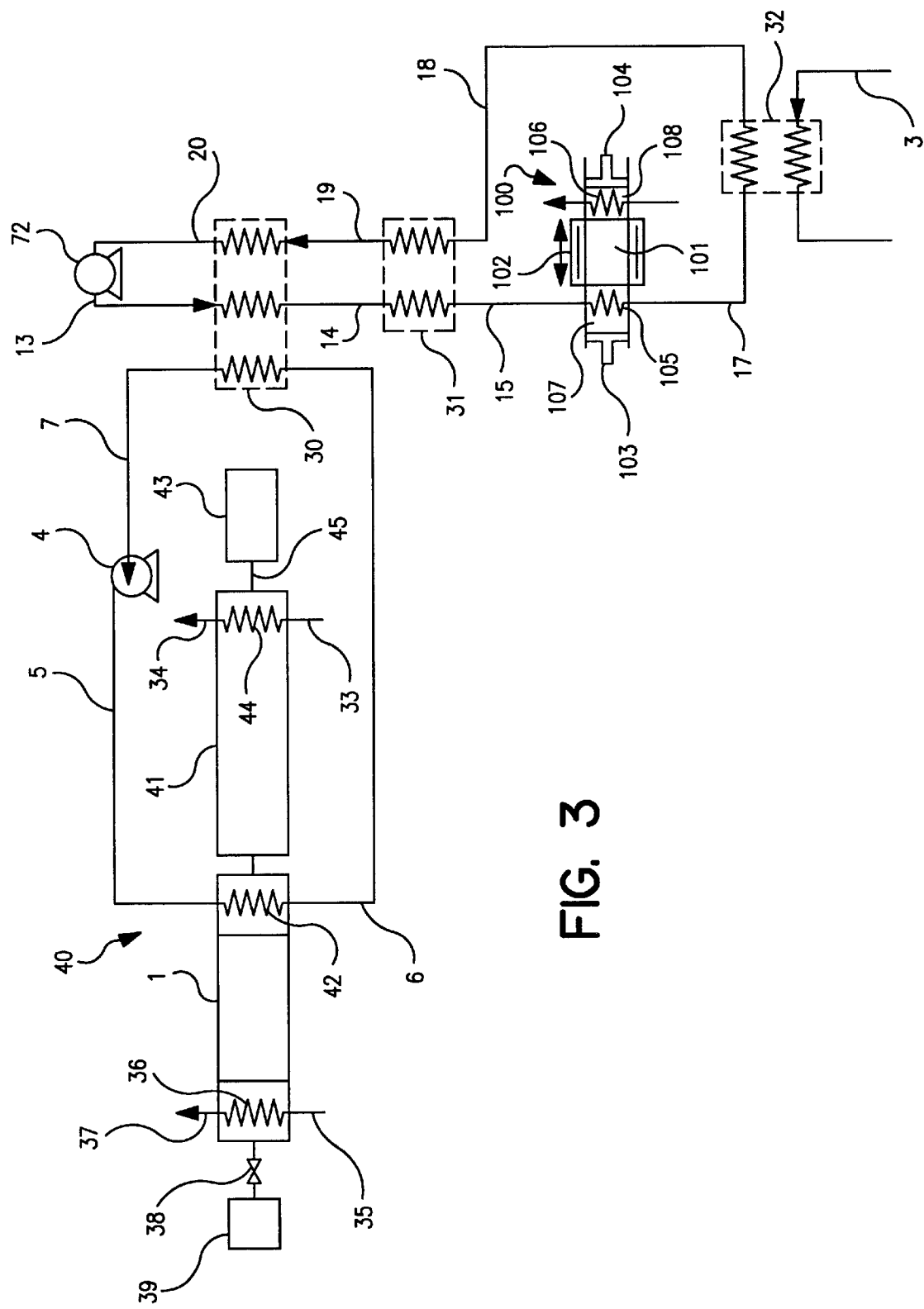
FIG. 3 is a schematic representation of another preferred embodiment of the invention wherein lower level refrigeration is provided to the cooled refrigeration fluid by operation of a magnetic refrigerator.

FIGS. 2 and 3 illustrate other preferred embodiments of the invention. The numerals in FIGS. 2 and 3 are the same as those of FIG. 1 for the common elements and these common elements will not be discussed again in detail. FIG. 2 illustrates an embodiment wherein lower level refrigeration is provided to the refrigeration fluid using a Brayton refrigerator and FIG. 3 illustrates an embodiment wherein lower level refrigeration is provided to the refrigeration fluid using a magnetic refrigerator.

Referring now to FIG. 2, Brayton system working fluid is compressed in Brayton system compressor 70 and the heat of compression is removed (not shown). Resulting refrigeration fluid 13 is desuperheated in heat exchanger 30 by returning stream 19 and by stream 6 to the first temperature. Resulting stream 14 is further desuperheated in heat exchanger 31 and expanded isentropically by Brayton system expander 71 to generate refrigeration and cool the refrigeration fluid or Brayton system working fluid to the second temperature. Resulting working fluid 17 provides refrigeration to heat load 3 in heat exchanger 32 and is then returned to the suction of Brayton system compressor 70.

Referring now to FIG. 3, magnetic refrigerator 100 comprises magnetizable material bed 101, moveable strong electromagnet or superconducting magnet 102, pistons 103 and 104, a cold heat exchanger 105 and a hot heat exchanger 106. Examples of magnetizable material which can be used in the practice of this invention include $GdNi_2$, $GdZn_2$, $GdTiO_3$, $Gd_2Ni_{17}$, $GdAl_2$, $GdMg$, $GdCd$, $Gd_4CO_3$, $GdGa$, $Gd_5Si_4$, and $GdZn$. The void space surrounding the magnetic bed particles in bed 101 and the volumes in piston cylinders 107 and 108 are filled with working fluid, examples of which include helium, neon, nitrogen, argon, methane, carbontetrafluoride fluorocarbons, hydrofluorocarbons, fluoroethers and hydrofluoroethers.

At the beginning of the cycle cold heat exchanger 105 is initially at a low temperature and hot heat exchanger 106 is at a warmer temperature. Magnet 102 is used to magnetize bed 101. The magnetocaloric effect causes each magnetic particle in bed 101 to warm slightly. Pistons 103 and 104 are moved to their extreme right position causing the enclosed working fluid, e.g. helium gas, to flow from the left cylinder 107, through cold heat exchanger 105, magnetic refrigerator bed 101 and hot heat exchanger 106 to fill the volume in cylinder 108. The particles in bed 101 are cooled by the flowing gas, and the gas in turn is warmed. Heat from the gas is transferred to cooling water as the gas flows through hot heat exchanger 106. When the pistons have reached their extreme right position the gas flow is stopped and the magnetic field is removed, cooling bed 101 by the magnetocaloric effect. Pistons 103 and 104 are moved back to their extreme left positions causing the helium gas to flow from cylinder 108, through hot heat exchanger 106, magnetic refrigerator bed 101 and cold heat exchanger 105 into cylinder volume 107. The helium gas is cooled by direct heat exchange as it passes through bed 101, and is warmed in cold heat exchanger 105 as it provides refrigeration into cooled refrigeration fluid to produce the cold refrigeration fluid at the second temperature which is further processed as was previously described. In this embodiment the refrigeration fluid is passed through the refrigeration fluid circuit by operation of pump 72.

In Table 1 there is tabulated the calculated energy requirements, in kilojoules per kilogram, to cool helium to 4.3 K using each of the three illustrated embodiments of the invention wherein the pulse tube refrigerator generates refrigeration from 300 K to 50 K and each of the multicomponent refrigerant cycle (A), Brayton refrigerator (B) and magnetic refrigerator (C) generate the refrigeration from 50 K to 4.3 K. For comparative purposes there is also shown, as comparative example D, the energy requirements for going from 300 K to 4.3 K using only a pulse tube system. As can be seen, the hybrid refrigeration system of this invention with the upstream pulse tube refrigerator enables a significant reduction in the energy requirements for the provision of comparable refrigeration over systems which employ only pulse tube refrigeration.

TABLE 1

| Refrigeration System | Energy Required |
|---|---|
| A | 58,100 |
| B | 45,200 |
| C | 40,800 |
| D | 707,100 |

Although the invention has been described in detail with reference to certain preferred embodiments, those skilled in the art will recognize that there are other embodiments of the invention within the spirit and the scope of the claims.

What is claimed is:

1. A method for providing refrigeration to a heat load comprising:
    (A) compressing pulse tube gas to produce hot compressed pulse tube gas, cooling the compressed pulse tube gas, and expanding the cooled pulse tube gas to produce cold pulse tube gas;
    (B) warming the cold pulse tube gas by indirect heat exchange with heat transfer medium to produce cooled heat transfer medium, and warming the cooled heat transfer medium by indirect heat exchange with refrigeration fluid to produce cooled refrigeration fluid at a first temperature within the range of from 20 to 280K;
    (C) providing refrigeration into the cooled refrigeration fluid to produce cold refrigeration fluid at a second temperature lower than said first temperature and within the range of from 3 to 150K; and
    (D) warming the cold refrigeration fluid by passing refrigeration from the cold refrigeration fluid into a heat load.

2. The method of claim 1 wherein the refrigeration fluid is a multicomponent refrigeration fluid.

3. The method of claim 1 wherein refrigeration is provided into the refrigeration fluid by expanding the refrigeration fluid.

4. The method of claim 3 wherein the expansion of the refrigeration fluid is isentropic expansion.

5. The method of claim 1 wherein refrigeration is provided into the refrigeration fluid by magnetizing a bed of magnetizable material, demagnetizing the magnetized bed material, cooling working fluid by bringing the working fluid into contact with the demagnetized bed material, and cooling the refrigeration fluid by indirect heat exchange with the cooled working fluid.

6. Apparatus for providing refrigeration to a heat load comprising:
   (A) a pulse tube refrigerator comprising a regenerator body, a pulse tube body having a pulse tube heat exchanger, means for generating pressurized gas for oscillating flow within the regenerator body, and means for expanding gas within the pulse tube body through the pulse tube heat exchanger;
   (B) a forecooling circuit comprising a forecooling heat exchanger, means for passing heat transfer medium from the pulse tube heat exchanger to the forecooling heat exchanger and means for passing heat transfer medium from the forecooling heat exchanger to the pulse tube heat exchanger;
   (C) means for passing refrigeration fluid to the forecooling heat exchanger, and means for providing refrigeration into the refrigeration fluid downstream of the forecooling heat exchanger; and
   (D) a heat load and means for passing refrigeration from the refrigeration fluid into the heat load.

7. The apparatus of claim 6 further comprising a compressor and an expansion device, wherein the means for passing refrigeration fluid to the forecooling heat exchanger includes the compressor, and the means for providing refrigeration into the refrigeration fluid downstream of the forecooling heat exchanger includes the expansion device.

8. The apparatus of claim 6 further comprising a magnetic refrigerator having a bed of magnetizable material, means for magnetizing and demagnetizing the bed of magnetizable material, and containing working fluid for contact with the bed of magnetizable material; wherein the means for providing refrigeration into the refrigeration fluid downstream of the forecooling heat exchanger includes means for passing refrigeration fluid in indirect heat exchange with said working fluid.

* * * * *